Oct. 25, 1927.
R. W. DINZL
RUBBER CUTTING MACHINE
Filed Jan. 31, 1927
1,646,447
2 Sheets-Sheet 1
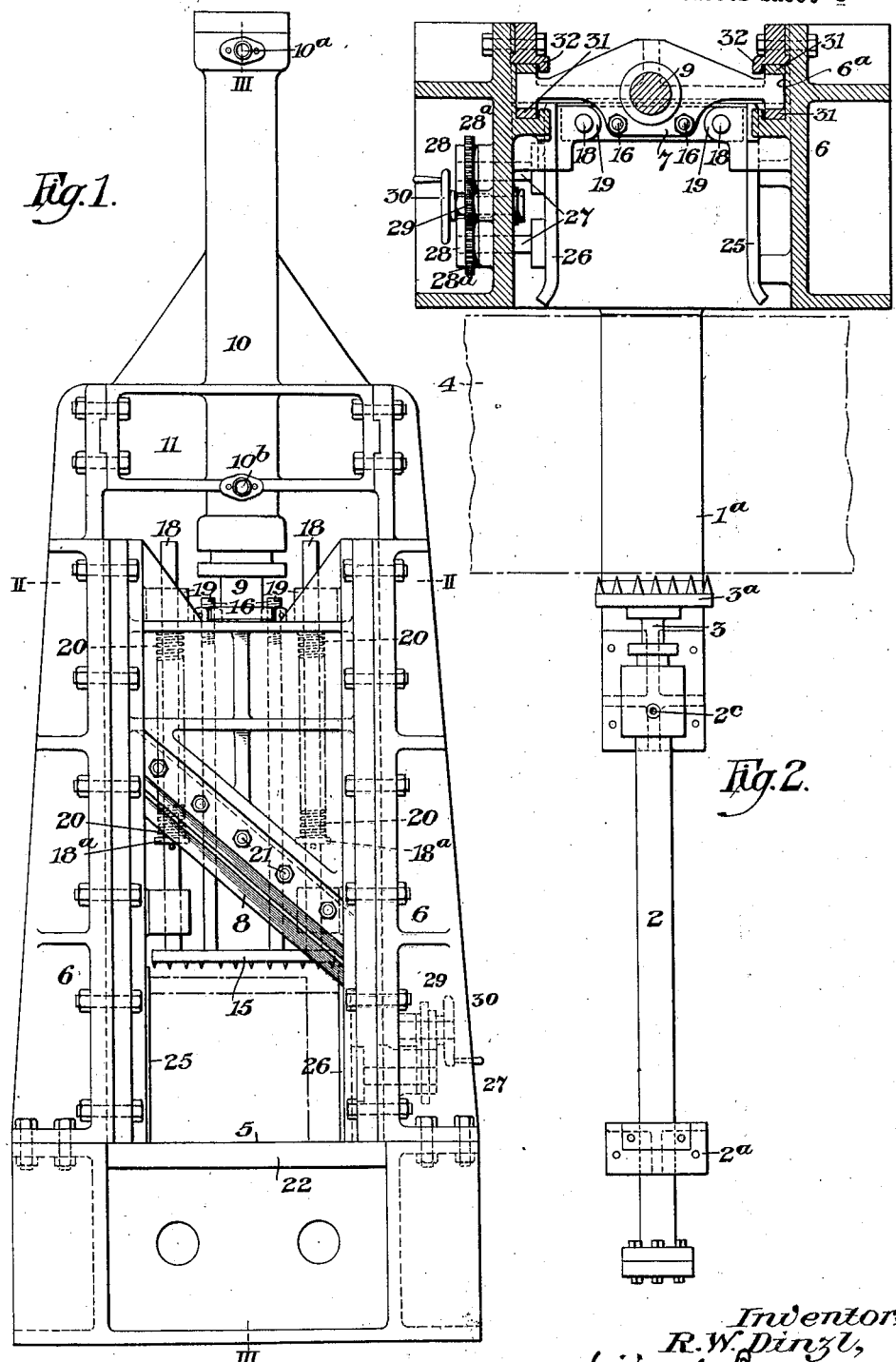
Inventor
R. W. Dinzl,
By Murray C Dover
Attorney Oct. 25, 1927.
R. W. DINZL
1,646,447
RUBBER CUTTING MACHINE
Filed Jan. 31, 1927    2 Sheets-Sheet 2
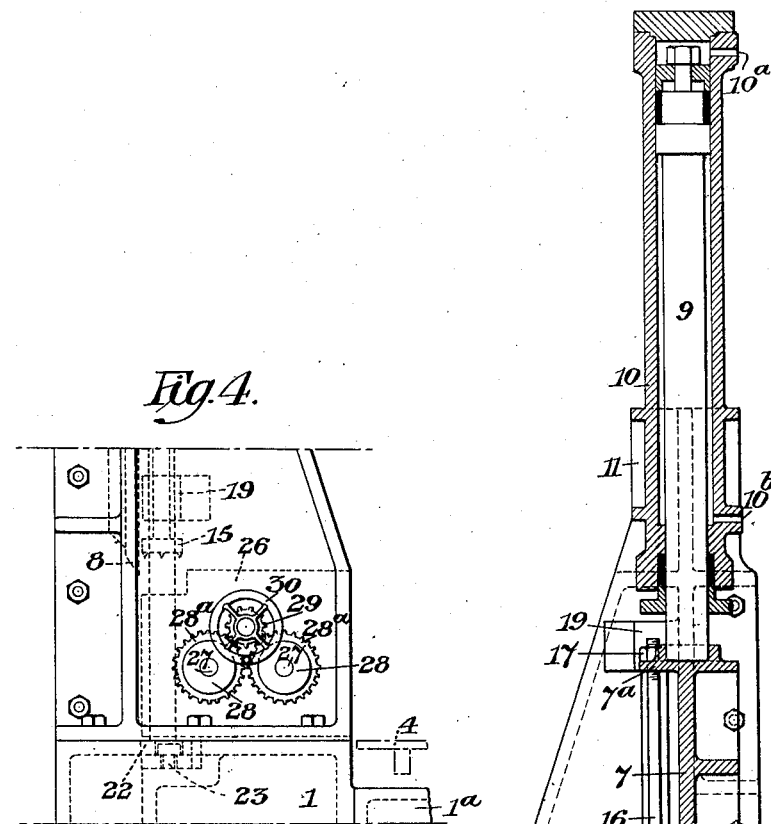
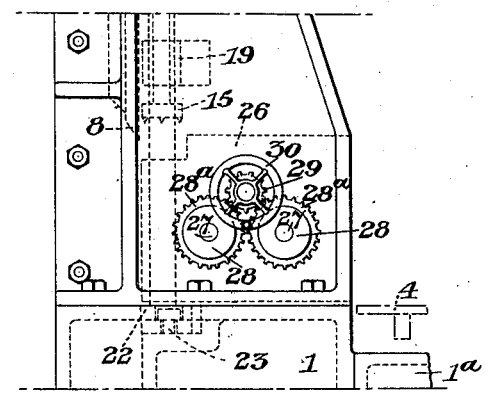
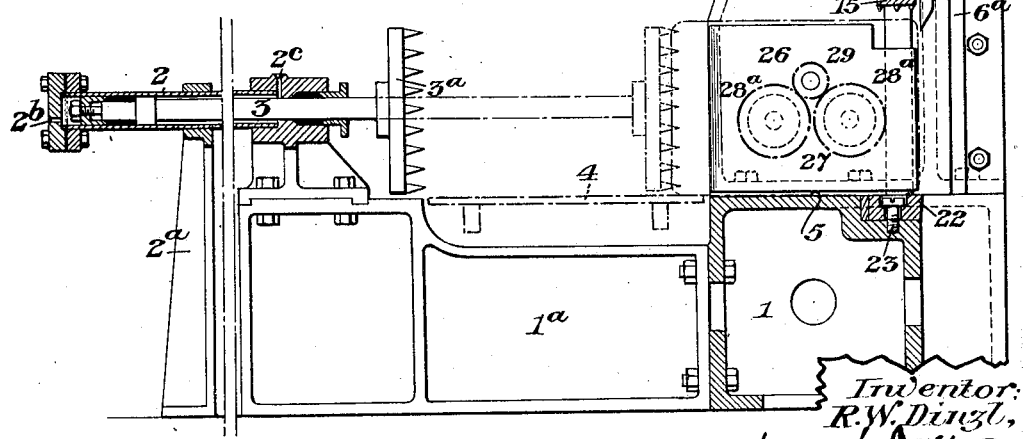
Inventor:
R. W. Dinzl,
By Murray C. Boyer
Attorney Patented Oct. 25, 1927.

1,646,447

UNITED STATES PATENT OFFICE.

RICHARD W. DINZL, OF BYWOOD, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA.

RUBBER-CUTTING MACHINE.

Application filed January 31, 1927. Serial No. 164,929.

My invention relates to machines for cutting or slicing rubber from the original commercial bale, for subsequent manipulation or working into various forms in the factory.

One object of my invention is to provide an apparatus in which the rubber can be handled mechanically from the time it is brought by a suitable conveyer and presented to a pushing element, and by the latter delivered to a cutting blade by means of which slices or layers of rubber are removed from the bale and passed to another conveyer.

My present machine comprises a suitable frame including a base or table to which the bales of rubber may be brought by any suitable conveyer, a traveling belt, truck, or the like; a fluid-pressure-operated pusher member designed to shove the bale from such conveyer on to the bed plate or table of the machine and to feed it forward between each slicing operation; means for laterally confining the bale on such bed plate; a fluid-pressure-operated guillotine knife, and a vertical clamping member cooperating with such knife and which is automatically brought down on top of a bale during a slicing operation.

These and other features of my invention are more fully described hereinafter, reference being had to the accompanying drawings in which:

Figure 1, is a front elevation of a rubber cutting machine within the scope of my invention, Fig. 2, is a sectional plan view on the line II—II, Fig. 1, Fig. 3, is a side elevation of the machine, in section on the line III—III, Fig. 1, and Fig. 4, is a fragmentary side elevation looking in the opposite direction to Fig. 3; illustrating a detail of my invention.

As indicated in the drawings, my improved machine may comprise a base 1, having an extension $1^a$; the latter supporting one end of a cylinder 2, containing a piston or plunger 3, operated by fluid-pressure and having at its forward end a tined or pronged member $3^a$ to engage the bales and push them from the platform of a conveyer 4, (indicated by broken lines), onto the upper surface or table 5, of the base 1.

The rear end of the cylinder 2 may be supported by a standard $2^a$, and pressure to move the plunger with its pronged end plate $3^a$ to push the bale from the conveyer 4 onto the table 5, may enter the cylinder at the point $2^b$; while pressure to retract such plunger may enter the cylinder at point $2^c$.

Superposed upon the base 1, adjacent its table 5, are a pair of side frames 6, providing vertical guides or slideways $6^a$, in which is mounted for vertical movement, a frame 7, carrying a guillotine knife 8. This frame is raised and lowered by means of a plunger 9, working in a cylinder 10, carried by the upper ends of the side frames 6 and said cylinder may be formed integral with a cross piece 11, which connects the upper ends of said side frames. Pressure to lower the plunger and its knife carrying frame may enter the cylinder at the point $10^a$, and pressure to raise the same may enter the cylinder at the point $10^b$.

The frame 7 carries a vertically movable holding device for the bales, which may be in the form of a pronged plate 15, carried by rods 16, threaded at their upper ends and having adjustable nuts 17, at said upper ends, whereby said rods may be suspended from a flange $7^a$, of said frame 7; the position of the nuts 17 sustaining the pronged plate 15 just above the bale (indicated by broken lines) when the frame 7, with its knife 8, is in the upper end inactive position. The rods 16 are adjustable to accommodate bales of different heights.

In addition to the screw rods 16, the pronged plate carries guide rods 18 passing through ears 19, formed on the frame of the machine; such guide rods having coiled springs 20 interposed between the flange $7^a$, and pin-supported washers $18^a$ carried by said guide rods, so that when the frame 7 is lifted, said springs will be compressed. When the frame is lowered during a cutting operation, the pronged plate 15 will follow and will be pushed by the springs 20 into contact with the bale of rubber immediately behind the guillotine knife and hold the same during the cutting or slicing operation.

The knife 8 may be of the angular type, diagonally disposed in the manner indicated in the drawing, and such knife may be secured to the frame 7, by suitable bolts 21, and nuts $21^a$. The table 5 may be provided with a shear plate 22, detachably secured by stud bolts 23.

In order that the bale may be confined laterally, the lower portion of the machine frame is provided with side plates 25 and 26, on opposite sides of the table 5; said plates being preferably provided with beveled portions at the point of entrance. One of said plates, that indicated at 25, for instance, may be fixed to one of the side frames of the machine, while the other, indicated at 26, is movable with respect to the side frame so that sufficient pressure may be applied to the bales to hold them in position during a cutting operation, but without restraining any forward movement which may be imparted by the horizontally operating plunger 3, and its pronged engaging end $3^a$. The movable plate indicated at 26, may be carried by screw rods 27, adapted to rotating nuts 28, having gear teeth $28^a$, adapted to mesh with a pinion 29, which may be turned by a hand wheel 30, in order to effect movement of such screw rods and with them said movable confining plate 26.

The knife carrying frame 7 may have wear plates 31 adapted to the slide-ways and the latter are provided with flanges 32 whose inner faces lie within the plane of the confining elements or plates 25 and 26, so as to insure passage of the bale and the slices cut therefrom, without danger of any possible contact with any lubricant employed on said slide-ways.

The slices cut from the bales may drop onto suitable conveying means; a truck, endless conveyer, or the like, whereby they may be carried away from the machine as they are cut from the bales.

I claim:

1. In a rubber cutting machine, the combination of a supporting platform, guides flanking the same, means for moving bales of rubber onto said platform and feeding the same thereon, a knife mounted over said platform and vertically movable in said guides, means for raising and lowering the knife with respect to a bale arranged to be moved across the platform, and vertically movable means for engagement with the bale simultaneously with the initial cutting actions of said knife.

2. In a rubber cutting machine, the combination of a supporting platform, guides flanking the same, means for moving bales of rubber onto said platform and feeding the same thereon, a guillotine knife mounted over said platform and vertically movable in said guides, means for raising and lowering the knife with respect to a bale arranged to be moved across the platform, and a follower for engagement with the bale simultaneously with the initial cutting actions of said knife.

3. In a rubber cutting machine, the combination of a supporting platform, guides flanking the same, means for moving bales of rubber onto said platform and feeding the same thereon, a knife mounted over said platform and vertically movable in said guides, means for raising and lowering the knife with respect to a bale arranged to be moved across the platform, and a follower automatically engaging the bale simultaneously with the initial cutting actions of said knife.

4. In a rubber cutting machine, the combination of a supporting platform, guides flanking the same, means for moving bales of rubber onto said platform and feeding the same thereon, a guillotine knife mounted over said platform, means for supporting said knife in the guides, means for raising and lowering the knife with respect to a bale arranged to be moved across the platform, a follower for engagement with the bale simultaneously with the initial cutting actions of said knife, and means for confining the bale laterally while it is moved on the table.

5. In a rubber cutting machine, the combination of a supporting table, side frames flanking the same, means for presenting bales of rubber to said table, means for feeding said bales across the same, a guillotine knife mounted over said table; the latter having a shearing edge cooperating with said knife, a carrier frame for said knife, guides in the side frames for said carrier frame, means for raising and lowering the knife and its frame with respect to a bale disposed on the table, and a follower for engagement with the bale simultaneously with the initial cutting actions of said knife; said follower being supported by the knife-carrying frame.

6. In a rubber cutting machine, the combination of a supporting table, side frames flanking the same, means for presenting bales of rubber to said table and feeding said bales across the same, a guillotine knife mounted over said table; the latter having a shearing edge cooperating with said knife, a carrier frame for said knife, guides in the side frames for said carrier frame, means for raising and lowering the knife with respect to a bale disposed on the table, a follower for engagement with the bale simultaneously with the initial cutting actions of said knife; said follower being supported by the knife-carrying frame, and means for adjusting the position of said follower.

7. In a rubber cutting machine, the combination of a supporting platform, side frames flanking the same, means for presenting bales of rubber to said table, means for feeding said bales across the same, a guillotine knife mounted over said platform; the latter having a shearing edge cooperating with said knife, a carrier frame for said knife, guides for said carrier frame, means for raising and lowering the knife with respect to a bale disposed on the platform, a follower automatically engaging the bale simultaneously with the initial cutting actions of said knife; said follower being supported by the knife-carrying frame, means for adjusting the position of said follower, means for confining the bale laterally as it is moved on the table, and means for adjusting said confining means.

8. In a rubber cutting machine, the combination of a supporting table; side frames flanking the same, means for presenting bales of rubber to said table, means for feeding said bales across the same, a guillotine knife mounted over said table, a frame carrying said knife, guideways for said knife-carrying frame, means for raising and lowering said frame and knife with respect to a bale disposed on the table, and an adjustable follower for engagement with the top of the bale simultaneously with the initial cutting actions of said knife.

9. In a rubber cutting machine, the combination of a supporting table, side frames flanking the same, means for presenting bales of rubber to said table, means for feeding said bales across the same, a knife mounted over said table, a frame carrying said knife, guideways for said knife-carrying frame, means for raising and lowering said frame and knife with respect to a bale disposed on the table, an adjustable follower for engagement with the top of the bale simultaneously with the initial cutting actions of said knife, and means for holding said follower in contact with the bale during the cutting operations.

10. In a rubber cutting machine, the combination of a supporting table; side frames flanking the same, means for presenting bales of rubber to said table, means for feeding said bales across the same, adjustable means for confining said bales laterally, a guillotine knife mounted over said table, a frame carrying said knife, guideways for said knife-carrying frame, means for raising or lowering said frame and knife with respect to a bale disposed on the table, and vertically movable holding means for engagement with the bale simultaneously with the initial cutting actions of said knife.

11. In a rubber cutting machine, the combination of a supporting platform, guides flanking the same and including flanged members, means for moving bales of rubber onto said platform and feeding the same thereon, a knife mounted over said platform, a carrier for said knife vertically movable in said guides, means for raising and lowering the knife with respect to a bale arranged to be moved across the platform, vertically movable means for engagement with the bale simultaneously with the initial cutting actions of said knife, and side plates for confining the bale laterally while it is moved on the table; the faces of said plates being disposed inwardly with respect to the flanged portions of the guides to protect the rubber from machine lubricant.

12. The combination, in a rubber bale cutting machine, of vertically disposed supports, a table, a frame slidably mounted in said supports, a knife carried by said frame, a follower member hung from the knife-carrying frame and arranged to lower with the latter and engage the top of the bale, and yielding means vertically disposed for holding said follower member in contact with the bale during the cutting operations.

13. The combination, in a rubber bale cutting machine, of vertically disposed supports, a table, a frame slidably mounted in said supports, a gullotine knife carried by said frame, a follower member hung from the frame and arranged to lower with the latter and engage the top of the bale, and springs for holding said follower member in contact with a bale during the cutting operations.

14. The combination, in a rubber bale cutting machine, of vertically disposed supports, a table, a frame slidably mounted in said supports, a guillotine knife carried by said frame, a follower member hung from the frame and arranged to lower with the latter and engage the top of a bale, springs for holding said follower member in contact with a bale during the cutting operation, and fluid-operated means for feeding the bale forward after each cutting operation.

In witness whereof I have signed this specification.

RICHARD W. DINZL.